(12) United States Patent
Di Mascio

(10) Patent No.: US 6,824,416 B2
(45) Date of Patent: Nov. 30, 2004

(54) MOUNTING ARRANGEMENT FOR PLUG-IN MODULES

(75) Inventor: Enrico Di Mascio, Turin (IT)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/426,885

(22) Filed: Apr. 30, 2003

(65) Prior Publication Data

US 2004/0219819 A1 Nov. 4, 2004

(51) Int. Cl.[7] .............................................. H01R 13/627
(52) U.S. Cl. ....................... 439/352; 439/160; 439/372
(58) Field of Search ................... 479/350, 352, 479/157, 159, 160, 357, 372, 607

(56) References Cited

U.S. PATENT DOCUMENTS

| 4,975,805 A | * | 12/1990 | Schmutzler | ................. 361/754 |
| 6,190,192 B1 | * | 2/2001 | White et al. | ................. 439/292 |
| 6,430,053 B1 | * | 8/2002 | Peterson et al. | ............. 361/728 |
| 6,439,918 B1 | * | 8/2002 | Togami et al. | ............... 439/372 |
| 6,506,065 B1 | * | 1/2003 | Castleman | ................... 439/157 |
| 2003/0171016 A1 | * | 9/2003 | Bright et al. | ................ 439/160 |

* cited by examiner

Primary Examiner—Hien Vu

(57) ABSTRACT

A plug-in module such as a transceiver for an optical communications system is adapted to be inserted into the front opening of a cage-like reception member and to slide into the reception member towards an end mounting position. The module comprises a latch mechanism for latching the plug-in module in the end mounting position in the reception member. The module includes a front face having opposite sides and the latch mechanism includes a pair of levers tiltably associated with the plug-in module at the opposite sides of the front face. The levers have homologous end portions with a transverse bar extending therebetween in a general bail-like fashion.

22 Claims, 2 Drawing Sheets

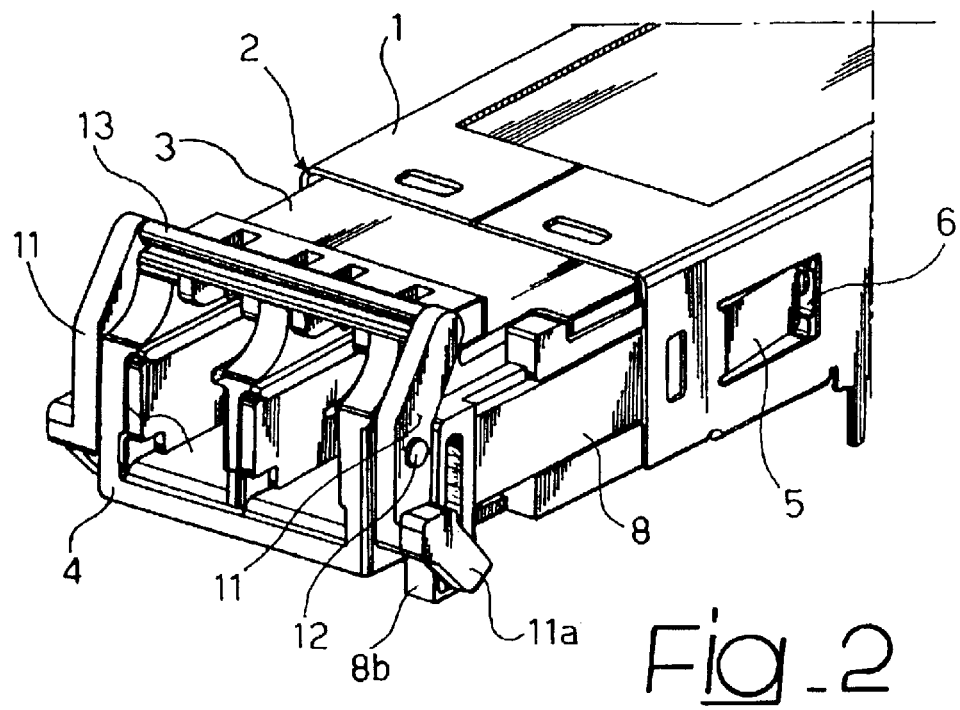
Fig_1
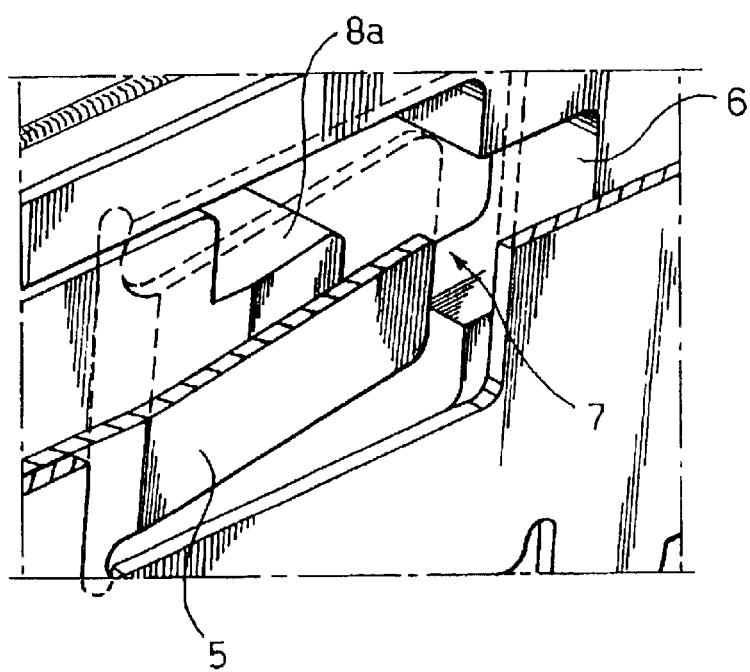
Fig_2

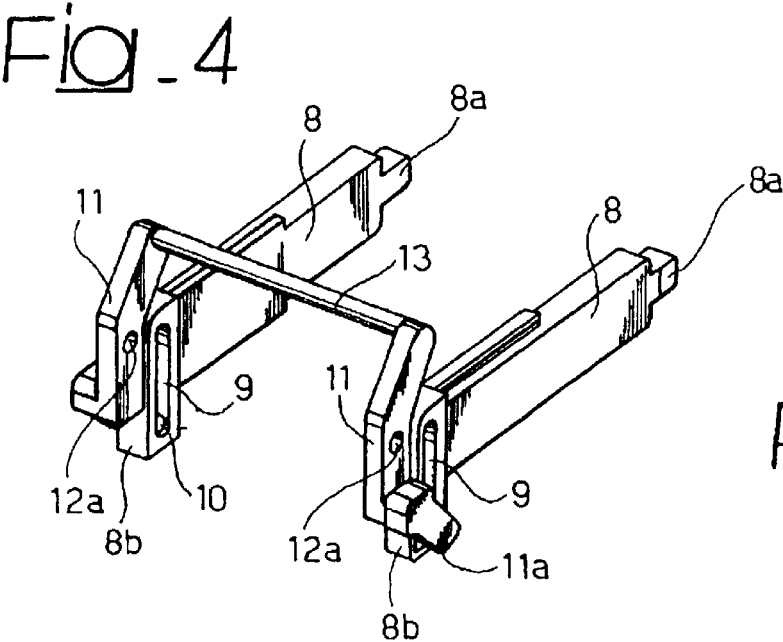
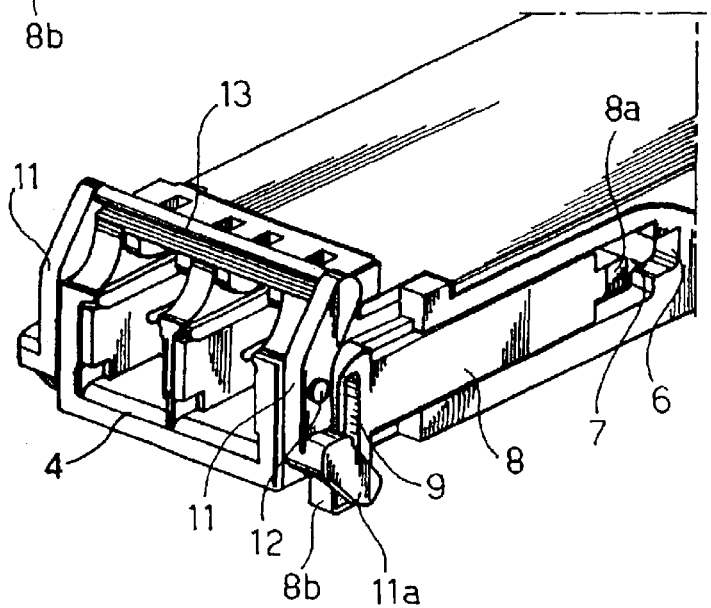
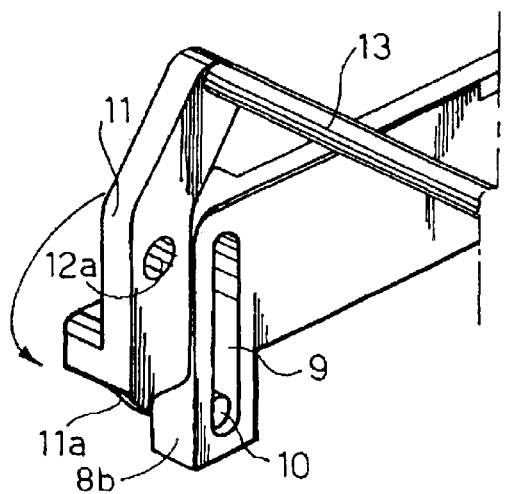

US 6,824,416 B2

MOUNTING ARRANGEMENT FOR PLUG-IN MODULES

FIELD OF THE INVENTION

The invention relates to mounting arrangements for plug-in modules.

DESCRIPTION OF THE RELATED ART

So-called "rack" mounting arrangements including a cage-like reception member and a plug-in module adapted to be inserted into the reception member and caused to slide into the reception member towards an end mounting position are currently used in many technical fields. Telecommunication equipment is an area exemplary of extensive use of such mounting arrangements.

The plug-in module is retained (i.e. locked or latched) in its end mounting position, which typically occurs via resiliently biased members such as elastic finger formations and the like. In order to permit the plug-in module to be extracted from the reception member, the locking member(s) must be acted upon in order to disengage and release the plug-in module.

In such arrangements, parts made of plastics or other materials are frequently used. These are intended to be deformed in order to lock or unlock the module depending on the kind of design. Such an approach has a basic disadvantage in that it may require appreciable deformation of, parts that are exposed to breaking, which leads to problems in terms of reliability.

In other solutions, the plug-in module is locked or latched as a result of a rotary motion rather than a translatory motion of parts. De-latching may be obtained via sliding surfaces that are kept in contact by elastic parts or elastic features included in the design. Again, such arrangements are disadvantageous in terms of reliability and may require additional parts such as a springs and the like.

Object and Summary of the Invention

The need is therefore felt for new, improved mounting arrangements wherein the disadvantages of prior art arrangements are dispensed with.

A first object of the invention is thus to provide such an improved mounting arrangement.

Another object of the invention is to provide a simple solution operable in connection with plug-in modules such as pluggable transceiver for optical transmission systems by permitting to unplug such modules from their mounting racks.

A further object of the invention is to provide a mounting arrangement wherein an operator can easily perform extraction of the plug-in module from the respective reception member.

A still further object of the invention is to provide a mounting arrangement wherein the locking/unlocking movement is produced directly by an operating member such as a bail-like operating member without requiring any other parts such as a springs to ensure the return movement of the de-latching part.

Still another further object of the invention is to provide the mounting arrangement wherein the moving parts that ensure the latching and de-latching actions are subjected to translation movements only without any deformation of the components involved.

The invention provides a simple solution to the problems and needs outlined in the foregoing.

BRIEF DESCRIPTION OF THE SEVERAL VIEWS OF THE DRAWINGS

Embodiments of the present invention will now be described, purely by way of non-limiting examples, with reference to the attached drawings, in which:

FIG. 1 is a general perspective view of a mounting arrangement,

FIG. 2 is an enlarged, partially broken view of FIG. 1,

FIG. 3 is another view essentially corresponding to FIG. 1, wherein some parts have been removed for the sake of clarity of illustration, FIG. 4 is a perspective view of a mechanism included in the arrangement shown in FIG. 3, and FIG. 5 details a part of the mechanism shown in FIG. 4.

DETAILED DESCRIPTION OF PREFERRED EMBODIMENTS OF THE INVENTION

Embodiments of a mounting arrangement and components thereof are described herein.

In the following description, numerous specific details are given to provide a thorough understanding of embodiments of the invention. One skilled in the relevant art will recognize, however, that the invention can be practiced without one or more the specific details or with other methods, components, materials and so on.

In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessary or referring to the same embodiment. Furthermore, the particular features, structures, or characteristic may be combined in any suitable manner in one or more embodiments.

In FIG. 1 reference 1 designates as a whole a cage-like reception member of a type currently used in so-called "rack" mounting arrangements. The reception member 1 is comprised of an essentially rigid frame of a parallelepiped shape having a front opening 2 of a general rectangular shape.

In the embodiment shown, the front opening has a rectangular shape with longer opposed sides extending horizontally and shorter opposed side extending vertically. In an alternative embodiment, the front opening 2 may have longer opposed sides extending vertically and shorter opposed sides extending horizontally. In still further embodiments the front opening 2 may have a shape other than a rectangular shape.

A plug-in module 3 is adapted for insertion into the reception member 1 via the front opening 2. The module 3 may be any kind of plug-in module. In a preferred application of the invention, the plug-in module 3 comprises of a transceiver for an optical communications system.

The plug-in module 3 preferably includes an outer casing comprised of a body having a shape complementary to the shape of the reception member 1.

In the embodiment shown, the plug-in module is of an essentially parallelepiped shape with a rectangular cross-section. Due to the complementary nature of the plug-in module 3 and the reception member 1, the same remarks made in the foregoing in respect of the shape of the front opening 2 identically apply to the cross-sectional shape of the plug-in module 3.

As a result of insertion into the front opening 2, the plug-in module 1 is adapted to slide into the reception member 1 to reach an end mounting position where a front face 4 of the module 3 is generally aligned with the plane of the front opening 2 of the reception member 1. Consequently, even after the plug-in movement is completed the front face 4 of the module remains accessible from the outside (e.g. for connecting electrical/optical cables-not shown-to the plug-in module 3).

The plug-in module 3 is retained (i.e. locked or latched) in the end mounting position within the reception member 1 by one or more lock or latch members.

In the exemplary embodiment shown herein, at least one resiliently biased latch member 5 is provided adapted to snap-engage a corresponding cavity provided in one of the lateral sides of the casing of the plug-in module 3.

In the exemplary embodiment shown herein (see especially FIG. 2), the latch member 5 is comprised of a resiliently biased "finger" formation. This finger formation is obtained by cutting and bending inwardly of the reception member 1 the sheet metal material usually comprising such a member 1.

Those of skill in the art will appreciate that many alternative arrangements exist for creating such a latch member adapted to cooperate with the plug-in module to latch the plug-in module 3 in its end mounting position within the reception member 1.

Preferably, two identical, latch fingers 5 are provided at both sides of the reception member 1. These two fingers are adapted to act on opposed sides of the casing of the plug-in module 3 in a substantially symmetrical way.

Preferably, such latch members are provided at the smaller sides of the reception member 1. Those of skill in the art will promptly appreciate this not to be a mandatory requirement, in that such latch members may be provided at other locations of the reception member 1.

Two co-operating recesses 6 are symmetrically provided at both sides of the casing of the plug-in module 3. As better appreciated in the views of figures and 3, each recess 6 essentially constitutes the distal end of a channel-like formation 7 adapted to house a respective cursor 8 slidably mounted within the channel formation 7. The cursor 8 has a distal end 8a extending in the vicinity of the distal end 6 of the channel formation 7 as well as a proximal end 8b adapted to at least marginally protrude out of the opening 2 when the plug-in module 3 is latched in the end mounting position within the reception member 1 as a result of the fingers 5 being extended into a locking arrangement into the recesses 6.

A substantially rectilinear slit 9 extends through the proximal end 8b of the or each cursor 8. The slit 9 extends generally cross-wise of the major dimension of the respective cursor 8.

In the exemplary embodiment shown herein, the plug-in module 3 is intended to be inserted and latched into the reception member 1 as a result of a horizontal sliding movement. Consequently, the cursors 8 generally extend in a horizontal direction, whereas the slits 9 extending through their proximal ends 8b are oriented in a substantially vertical direction.

The or each slit 9 is intended to constitute a guide member slidably receiving a pin 10 (see especially FIGS. 4 and 5) carried at the distal portion of an arm included in a lever 11 tiltably mounted on the casing of the plug-in module 3.

More specifically, the pin 10 is carried by the lower arm 11a of the lever 11. The lever 11 is mounted on the casing of the plug-in module 3 in the vicinity of the proximal end 8b of a respective cursor 8 via a horizontally extending pin 12 adapted to engage a corresponding hole 12a provided in the lever 11. The pin 12 thus defines a generally horizontal tilting axis for the lever 11 with respect to a substantially vertical rest position as shown in FIG. 5.

The symmetrical arrangement shown in the figures of the drawing, provides for the two cursors 8 having respective tilting levers 11 associated to cooperate with the proximal ends 8b of the cursors 8 as better explained in the following.

Two symmetrical levers 11 are thus provided at both sides of the front portion 4 of the plug-in module 3.

A transverse bar 13 connects the upper ends of the two levers 11 in a general bail-like fashion.

The lengths of upper portion of the levers 11 and/or the shape of the bar 13 are selected in such a way that the bar 13 extends approximately at the upper side of the casing of the plug-in module 3. As a result of this arrangement, when the levers 11 are in their vertical rest position the bar is unobtrusive in respect of any operation related to plugging/unplugging connectors from the front face 4 of the plug-in module 3.

Specifically, the view of FIG. 3 shows the latching arrangement comprised of:

the channel-like formations 7 each having the recess 6 at their distal end, the cursors 8 arranged into the channel-like formations 7 adapted for a longitudinally sliding therein, the proximal end 8b of each cursor 8 having the slit 9 extending therethrough and into which one of the pins 10 is slidably engaged, and the levers 11 connected by the bar 13 and carrying the pins 10 at their lower extremities.

When intended to be inserted into the reception member 1, the plug-in module 3 is first introduced into the front opening 2 of the reception member 1. The module 3 is then caused to slide into the reception member 1 until the end mounting position is reached where the resilient fingers 5, previously urged away from each other as a result of the distal end of the casing of the module 3 being caused to slide therebetween, snap-engage the end portion of the channel-like formations 7 immediately adjacent the recesses 6.

Under these conditions, the plug-in module 3 is safely received in the reception member 1, latched in its end mounting position and thus secured against undesired displacement from such a mounting position. In fact such movement is impeded by the finger formations 5 urging against the shoulders formed in the channel-like formations 7 immediately adjacent the recesses 6.

The levers 11 extend vertically and the bail-like arrangement comprised of the levers 11 and the transverse bar 13 frames in a portal-like fashion the front face 4 of the plug-in module 3. Essentially, this mutual positioning of parts can be maintained without the provision of any specific biasing arrangement such as springs and the like, while the snap-in engagement position of the fingers 5 into the channel-like formations 7 immediately adjacent the recesses 6 may in fact correspond to an unbiased, elastically undeformed rest position of such fingers.

When wishing to remove the plug-in module 3 from the reception member 1, the operator simply has a gently act on the bar 13 by causing the bail-like formation comprised of the bar 13 and the two levers 11 to tilt forwardly around the pins 12 away from the front opening 2 of the reception member 1 (see also the schematic representation of FIG. 5.

As a result of this tilting movement, the connecting bar 13 and the upper ends of the levers 11 will move away from the member 1. Simultaneously, the lower ends 11a of the levers 11 carrying the pins 10 will be urged to move towards the reception member 1.

The cam-like arrangement comprised of the pin 10 and the slit 9 at the proximal end 8b of each cursor 8 will convert the rotary tilting movement of the respective lever 11 into a linear movement urging the cursor to slide forwardly, thus further penetrating into the reception member 1.

As a result of this penetration movement, the distal ends 8a of the cursors 8 will, advance towards and into the recesses 6. As a result of this advancement movement the distal ends 8a of the cursors 8 will act on the resilient fingers 5 by causing them to move apart and out of the channel-like formations 7 against their elastic bias force. The fingers 5 being disengaged from the channel-like formations 7 will make it possible for the plug-in module 3 to be released from the locking engagement with the reception member 1.

It will be appreciated that the distal ends 8a of the cursors 8 are intended to slidably co-operate with the recesses 6 in order to ensure that, during the de-latching movement, the finger formations 5 do not undesirably "jam" with the shoulder portions between the channel-like formations 7 and the recesses 6.

As a result of the de-latching action just described, the plug-in module 3 will be easily pulled out and away from the reception member 1 by means of a moderate pulling action exerted on the bail-like formation comprised of the bar 13 and the levers 11.

Such a bail-like formation will also act as a handle to permit the plug-in module 3 to be carried once removed from the reception member 1.

The above description of illustrated embodiments of the invention, including what is described in the abstract, is not intended to be exhaustive or to limit the invention to the precise form disclosed. While specific embodiments of, and examples for, the invention are described herein for illustrative purposes, various equivalent modifications are possible within the scope of the invention and can be made without deviating from the spirit and the scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A mounting arrangement including:
   a cage-like reception member having a front opening,
   a plug-in module adapted to be inserted into said front opening and to slide into said reception member towards an end mounting position,
   at least one latch member adapted to cooperate with said plug-in module to latch said plug-in module in said end mounting position in said reception member,
   a de-latching mechanism operable to act on said latch member to disengage said latch member and said plug-in module to permit said plug-in module to move away from said end position and being thus extracted from said reception member, wherein said de-latching mechanism comprises:
   at least one lever tiltably associated with said plug-in module,
   at least one cursor slidably associated with said plug-in module, said at least one cursor having a first end operably associated with said at least one lever and a second end extending in the vicinity of a location of said plug-in module adjacent said latch member when said plug-in module is in said end mounting position in said mounting arrangement, whereby tilting said at least one lever with said plug-in module mounted in said end mounting position in said reception member causes said at least one cursor to slide with respect to said plug-in module and to cooperate with said latch member causing said latch member and said plug-in module to disengage from each other, whereby said plug-in module is adapted to move away from said end mounting position to be extracted from said reception member,
   a cam-like mechanism jointly defined by said at least one cursor and said at least one lever, said cam-like mechanism for converting tilting of said at least one lever into a sliding movement of said at least one cursor, wherein said cam-like mechanism includes:
   a slit in one end of said at least one cursor and said at least one lever, and
   a pin slidably engaging said slit and carried by one end of the other of said at least one cursor and said at least one lever.

2. The arrangement of claim 1, wherein said plug-in module includes a front face having opposite sides and said de-latching mechanism includes a pair of said levers tiltably associated with said plug-in module at said opposite sides; said pair of levers having homologous end portions having a bar extending therebetween in a general bail-like fashion.

3. The arrangement of claim 2, wherein at least one of the lengths of said levers and the shape of said bar are such that said general bail-like fashion is substantially unobtrusive of said front face of said plug-in module.

4. The arrangement of claim 1, wherein said at least one latch member is comprised of finger formation adapted to engage said plug-in module.

5. The arrangement of claim 4, wherein said at least one latch member is comprised of a finger formation adapted to snap-engage with said plug-in module.

6. The arrangement of claim 5 wherein said latch member is a formation adapted to at least marginally extend into said reception member.

7. The arrangement of claim 1, wherein said reception member is at least partially comprised of a sheet-like material, said at least one latch member being comprised of a cut and bent portion of said sheet-like material.

8. The arrangement of claim 1, wherein said plug-in module is provided with a channel-like formation with said at least one cursor slidably mounted in said channel-like formation.

9. The arrangement of claim 1, wherein said at least one cursor has a major direction of extension and said slit is provided in said at least one cursor extending substantially cross-wise of said major direction of extension.

10. The arrangement of claim 9, wherein said at least one lever has an arm extending towards said at least one cursor, with said pin mounted on said major direction of extension.

11. The arrangement of claim 10, wherein said plug-in module includes a casing having opposite sides, wherein a pair of said levers are provided at opposite ends of said casing, said pair of levers having homologous first ends, each said homologous first ends carrying said pin, as well as homologous second ends, and wherein a bar connects said homologous second ends in a general bail-like arrangement.

12. A plug-in module for mounting in a cage-like reception member having a front opening, the module adapted to be inserted into said front opening, to slide into said reception member towards an end mounting position, the module comprising:
  at least one lever tiltably associated with said plug-in module,
  at least one cursor slidably associated with said plug-in module, said at least one cursor having a first end operably associated with said at least one lever and a second end adapted to cooperate with said reception member to latch said plug-in module in said end mounting position in said reception member,
  whereby tilting said at least one lever causes said at least one cursor to slide with respect to said plug-in module and disengage said plug-in module from said reception member, whereby said plug-in module is adapted to move away from said end mounting position to be extracted from said reception member,
  a cam-like mechanism jointly defined by said at least one cursor and said at least one lever, said cam-like mechanism for converting tilting of said at least one lever into a sliding movement of said at least one cursor, wherein said cam-like mechanism includes:
  a slit in one end of said at lest one cursor and said at least one lever, and
  a pin slidably engaging said slit and carried by one end of the other of said at least one cursor and said at least one lever.

13. The module of claim 12, including a front face having opposite sides and said de-latching mechanism includes a pair of said levers tiltably associated with said plug-in module at said opposite sides; said pair of levers having homologous end portions having a bar extending therebetween in a general bail-like fashion.

14. The module of claim 13, wherein at least one of the lengths of said levers and the shape of said bar are such that said general bail-like fashion is substantially unobtrusive of said front face of said the plug-in module.

15. The module of claim 12, including a channel-like formation with said at least one cursor slidably mounted in said channel-like formation.

16. The module of claim 12, wherein said at least one cursor has a major direction of extension and said slit is provided in said at least one cursor extending substantially cross-wise of said major direction of extension.

17. The module of claim 16, wherein said at least one lever has an arm extending towards said at least one cursor, with said pin mounted on said major direction of extension.

18. The module of claim 17, wherein said plug-in module includes a casing having opposite sides, wherein a pair of said levers are provided at opposite ends of said casing, said pair of levers having homologous first ends, each said homologous first ends carrying said pin, as well as homologous second ends, and wherein a bar connects said homologous second ends in a general bail-like arrangement.

19. A plug-in module for mounting in a cage-like reception member having a front opening, the module adapted to be inserted into said front opening, to slide into said reception member towards an end mounting position, the module comprising a latch mechanism for latching said plug-in module in said end mounting position in said reception member, wherein the module includes a front face having opposite sides and said latch mechanism includes a pair levers tiltably associated with said plug-in module at said opposite sides; said pair of levers having homologous end portions having a bar extending therebetween in a general bail-like fashion, wherein each said lever ha as an associated cursor, said cursor having a first end operably associated with said lever and a second end adapted to cooperate with said reception member to latch said plug-in module in said end mounting position, whereby tilting said lever causes said associated cursor to slide with respect to said plug-in module and disengage said plug-in module from said reception member, whereby said plug-in module is adapted to move away from said end mounting position to be extracted from said reception member,
  a cam-like mechanism jointly defined by each said lever and the associated cursor, said cam-like mechanism for converting tilting of said lever into a sliding movement of said at least one cursor, wherein said cam-like mechanism of each said lever and the associated cursor includes;
  a slit in one end of said associated cursor and said lever, and
  a pin slidably engaging said slit and carried by one end by the other of said associated cursor and said lever.

20. The module of claim 19, wherein at least one of the lengths of said levers and the shape of said bar are such that said general bail-like fashion is substantially unobtrusive of said front face of said plug-in module.

21. The module of claim 19, wherein said associated cursor has a major direction of extension and said slit is provided in, said at least one cursor extending substantially cross-wise of said major direction of extension.

22. The module of claim 21, wherein said lever has an associated cursor, with said pin mounted on said arm.

* * * * *